United States Patent
Tsikouras et al.

(10) Patent No.: US 10,018,834 B2
(45) Date of Patent: Jul. 10, 2018

(54) APPARATUS AND METHOD FOR FOCI ARRAY SCANNING THROUGH AN ADJUSTING REFRACTIVE MEDIUM

(71) Applicant: MCMASTER UNIVERSITY, Hamilton (CA)

(72) Inventors: Anthony Tsikouras, Dundas (CA); Qiyin Fang, Grimsby (CA)

(73) Assignee: MCMASTER UNIVERSITY, Hamilton, ON (CA)

( * ) Notice: Subject to any disclaimer, the term of this patent is extended or adjusted under 35 U.S.C. 154(b) by 126 days.

(21) Appl. No.: 14/915,333

(22) PCT Filed: Aug. 8, 2014

(86) PCT No.: PCT/CA2014/050748
§ 371 (c)(1),
(2) Date: Feb. 29, 2016

(87) PCT Pub. No.: WO2015/031988
PCT Pub. Date: Mar. 12, 2015

(65) Prior Publication Data
US 2016/0209643 A1 Jul. 21, 2016

Related U.S. Application Data

(60) Provisional application No. 61/874,003, filed on Sep. 5, 2013.

(51) Int. Cl.
G02B 26/08 (2006.01)
G02B 26/10 (2006.01)
(Continued)

(52) U.S. Cl.
CPC .............. G02B 26/101 (2013.01); G01J 1/42 (2013.01); G01J 3/2823 (2013.01);
(Continued)

(58) Field of Classification Search
CPC .............. G02B 26/0875; G02B 26/101; G02B 21/0036; G01J 1/42; G01J 2001/4238; G01J 3/2823
(Continued)

(56) References Cited

U.S. PATENT DOCUMENTS 8,045,250 B1 10/2011 Gross
8,441,704 B2 5/2013 Matsuoka
(Continued)

OTHER PUBLICATIONS

International Search Report in PCT Application No. PCT/CA2014/050748 dated Oct. 17, 2014.
(Continued)

*Primary Examiner* — Euncha Cherry
(74) *Attorney, Agent, or Firm* — Lynn Schumacher; Hill & Schumacher

(57) ABSTRACT

A method and apparatus for performing foci array scanning using at least one adjustable or tilting medium is disclosed. The medium can be controllably tilted in order to translate a beam of electromagnetic radiation perpendicularly to its propagation, and upon exiting the medium, will propagate in the original, incoming direction. This allows the apparatus that emits the radiation, such as a laser, to remain stationary and still scan a 2D array. Additionally, the reflected fluorescence light undergoes the opposite shift to "reverse" the scanning shift and bring the beamlets back in line with a lenselet array. So the collection fibers can remain static and collect light from different spots on the sample from during the scan.

11 Claims, 2 Drawing Sheets

(51) Int. Cl.
*G02B 21/00* (2006.01)
*G01J 1/42* (2006.01)
*G01J 3/28* (2006.01)

(52) U.S. Cl.
CPC ..... *G02B 21/0036* (2013.01); *G02B 26/0875* (2013.01); *G01J 2001/4238* (2013.01)

(58) Field of Classification Search
USPC .......... 359/201.1, 202.1, 204.1–204.4, 209.1
See application file for complete search history.

(56) References Cited

U.S. PATENT DOCUMENTS

| | | | |
|---|---|---|---|
| 2001/0052979 A1* | 12/2001 | Treado | G01B 11/2545 356/326 |
| 2004/0080842 A1* | 4/2004 | Aziz | G02B 17/02 359/857 |
| 2010/0195681 A1 | 8/2010 | Tatsuno et al. | |
| 2011/0310450 A1 | 12/2011 | Amada et al. | |
| 2012/0281258 A1 | 11/2012 | Sheblee et al. | |
| 2015/0286041 A1 | 10/2015 | Sheblee et al. | |

OTHER PUBLICATIONS

Written Opinion in PCT Application No. PCT/CA2014/050748 dated Oct. 17, 2014.

* cited by examiner

APPARATUS AND METHOD FOR FOCI ARRAY SCANNING THROUGH AN ADJUSTING REFRACTIVE MEDIUM

CROSS-REFERENCE TO RELATED APPLICATIONS

This application is a National Phase application claiming the benefit of PCT/CA2014/050748 filed on Aug. 8, 2014, in English, titled "APPARATUS AND METHOD FOR FOCI ARRAY SCANNING THROUGH AN ADJUSTING REFRACTIVE MEDIUM", which further claims priority to U.S. Provisional Patent Application No. 61/874,003 filed on Sep. 5, 2013, the entire contents of which are incorporated herein by reference.

FIELD

The present disclosure relates to an apparatus and method for optical scanning using a multiplexing array.

BACKGROUND

Scanning using beams of electromagnetic radiation is used in a myriad of present day technologies; from 3D environment scanning to spectrography to microscopy. As such, an efficient method, apparatus and system are needed to accelerate the process. Prior art teaches the use of one or a few beams to scan an environment and can determine environmental information based on the reflected beam. To efficiently operate the beam, or beams, to scan the environment, a constant propagation angle may need to be maintained, while still traversing a 2D grid.

Many current technologies use a single or only a few focal points to scan 3D areas. Specifically, conventional confocal microscopy raster scans a single focal point to generate 3D information. To improve data acquisition speed, an multiplexing array of foci can be used.

A typical example of a multiplexing scheme is the Yokogawa spinning disk confocal method where an array of microlenslets on a rotating disk covers the full field of view. The present technology for beam scanning usually employs galvanometric mirrors in a way to alter the angle of the beam. It does this to scan a 2D (x and y) grid. However, given the nature of a galvanometric mirror, this method only works with one or a few beams. If one were to introduce a larger array of beams to accelerate the process, as is commonly done in multiplexing confocal microscopy, the galvanometric mirror will not treat all the beams uniformly and descan are not disclosed in prior art. As the galvanometric mirrors oscillate across an angle, different beams will scan out different ranges of the sample. Therefore, if one beam is aligned to scan a specific region, then other beams on the periphery will potentially behave differently and scan too small or too large of a region; leaving parts of the sample scanned multiple times, while other parts are not scanned at all. The galvo window setup is another method that is disclosed in prior art; however its use is limited to laser machining, and the benefits of multiplexing and descan are not explored.

Alternatively, a prism is also presently used in the art to accomplish a similar goal to the galvanometric mirror. Rotating a prism can predictably refract beams, but incur the same issues as the galvanometric mirror in that if an array of beams were to be used, all beams would not be refracted equally.

Another option is translation stages which can also be used to move mirrors forward and backward to change the deflection of a beam while maintaining a constant propagation angle. However, translation stages generally do not offer a good combination of speed, resolution, and mass supported. The fastest and most accurate stages are piezoelectric stages, but these have very low load capacities and travel ranges.

SUMMARY

The present disclosure details the use of a controllably adjustable refractive medium that uniformly refracts parallel beams of radiation, or a beam of radiation that maintains a constant propagation direction, independent of the location that the beams contacts the refractive mediums. The refractive medium may translate the beam perpendicularly to its propagation, leaving the direction of the beam exiting parallel to the direction of the beam entering the device. Additionally, a secondary refractive medium may be introduced that translates the beam or beams of radiation perpendicularly to both the incoming beam and the direction the first refractive medium translates the beam, giving the array a 2D space to traverse.

The refractive medium may be glass, plastic, fluorite or another refractive medium that has a uniform composition and uniformly treats parallel beams of radiation, independent of the contact location on the medium. The refractive abilities of the device rely on the refractive medium, thickness of the medium, and range that the medium can adjust, all of which can be chosen to optimally suit a specific application. For example, a glass medium maintains good linearity ($R^2 \geq 0.999$) for angles less than twenty five degrees. The device may further be attached to a 2D-1D fiber array cable that converts the 2D foci array into a 1D foci array that can be attached to a device able to use the provided data.

Thus, there is disclosed a An apparatus for translating an array of light beams, comprising:

a refractive medium having first and second opposed surfaces and having a preselected index of refraction, said refractive medium being movably mounted to allow adjustment of an angle of incidence of an array of light beams on said first surface of said refractive medium, wherein the array of light beams has a direction of propagation, wherein for a given index of refraction and a given angle of incidence of each beam of light on the said first surface, each beam of light, upon exiting said second surface, is translated a known amount laterally, and parallel to, each beam's direction of propagation independently of a location of contact between the array of light beams and refractive medium.

There is also disclosed at method for translating an array of light beams, comprising:

directing an array of light beams having a direction of propagation towards a first surface of a refractive medium having a preselected index of refraction, at an adjustable angle of incidence, wherein for a given index of refraction and a given angle of incidence of each beam of light on the said first surface, each beam of light, upon exiting a second surface parallel to said first surface, is translated a known amount laterally, and parallel to, each beam's direction of propagation independently of a location of contact between the array of light beams and refractive medium.

A further understanding of the functional and advantageous aspects of the invention can be realized by reference to the following detailed description and drawings.

BRIEF DESCRIPTION OF THE DRAWINGS

Embodiments will now be described, by way of example only, with reference to the drawings, in which.

A further understanding of the functional and advantageous aspects of the disclosure can be realized by reference to the following detailed description and drawings.

DETAILED DESCRIPTION

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the phrase "descan" refers to the ability of a scanning mechanism to reverse the deflection it caused in the forward propagating direction. As a result, the focus or foci array on the sample will be moving to scan the sample, while the fluorescent light that has travelled back through the scanner will experience an inverted shift, and so the focus or foci array at this point will be static. Galvanometer scanners are an example of a descanning system. A Yokugawa spinning disk scanner is not descanning, and so the positions of the fluorescent foci collected back through the spinning disk scanner are always moving with the scanning position. The advantage of a scanning method that also descans is that a static detector or array of detectors can be used at the collection output.

Figure 1:
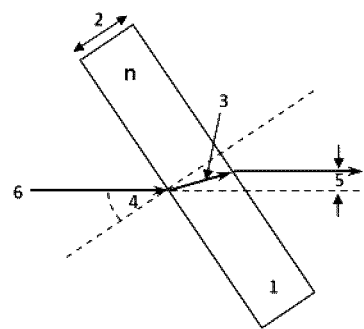
FIG. 1 shows the translation of a beam passing through a refractive medium in which the output beam is translated parallel to the incident beam.

It is currently proposed to scan 2D foci array using an adjusting refractive medium. In one embodiment, as shown in FIG. 1, manipulating a beam of radiation 6 is accomplished by passing the beam through a refractive medium 1 that can be controllably tilted or adjusted. Refractive medium 1 includes parallel opposed surfaces, with a first surface being the surface on which the beam(s) of light are incident, and a second opposed surface parallel to the first surface out of which the beams exit medium 1. As shown in the FIG. 1, the propagation of the non-normal incident collimated beam 6 can be shifted perpendicularly by a small distance 5, while its propagating direction is maintained without change. The lateral shift 5 depends on the incident angle 4 (which is also referred to as the adjustable tilt angle), the refractive index n of the refractive medium, and the thickness 2 of the medium. In an embodiment, the refractive medium 1 is able to uniformly refract multiple beams such that they maintain their relative position to each other. This allows the array to be moved as a single unit and allows for more efficient scanning. This is accomplished by passing the beam of radiation through refractive medium 1 that has a uniform density different than the surroundings. This is done to the beam of radiation 6 to alter its direction 3 and return it to its original propagation angle (to be parallel to the incident direction prior to passing through medium 1) upon exiting the medium 1. All incident beams of radiation parallel to beam 6 will experience an identical resulting deflection, which allows for uniform shifting of the beams as required.

Additionally, the instrument is very tunable. The refractive medium's material, thickness and tilt range determine the scanning range of the device. Therefore, an angular resolution of a tilt range can be overcome by changing the thickness or material of the refractive medium, and in some embodiments; these are made to be adjustable. The beam deflection is quite linear when the tilt angle is less than 25 degrees for typical glass (where quite linear means $R^2 \geq 0.999$). This linearity is also important in creating a highly accurate multiplexing scenario. Beyond this, the relationship is not linear, but it will still scan the array uniformly. Therefore, the non-linearity is accounted for, and the reflection losses are not too great, the scanner is not limited to 25 degrees. However, changing the thickness or material would be a better way of accomplishing this. Possible refractive media include, but are not limited to, glass; plastic and fluorite.

Preferred embodiments use galvo-mounted windows for controllably tilting the refractive media. It is the economic option, is very fast in step mode, or even can operate in resonant mode, and has much better angular resolution than is required. Alternatively, other tilting mechanisms such as tip-tilt stages can be used, but they are typically more expensive, limited in angle range, and often do not have an open aperture (i.e. they are intended for a mirror to be mounted).

The galvo setup currently moves in steps. An absolute angle is sent for the galvo to move to, and it moves in a fraction of a millisecond. This can be done while the readout camera is reading out the last frame. The galvo can also be set up to scan continuously if greater speeds are required, and can reach resonant speeds.

A secondary refractive medium can also optionally be introduced that refracts light perpendicularly (on the y-axis) to the incoming beam (z-axis) and the direction that the first refractive medium 1 refracts light (x-axis) based on the same physical principles outlined before. By introducing this second refractive medium, the single or plurality of beams can effectively scan an area. This provides a method of moving a laser beam position in the direction perpendicular to its propagation without changing the direction of propagation.

In one embodiment of the invention, to use the beam shifting method in 2D foci array scanning in a confocal set up; galvanometer scanners are used to tilt glass windows in order to scan the foci array image generated by a lenslet array. The glass windows are used to achieve raster scanning in the x-y plane, where the x-y plane, as before, is the plane perpendicular to the incoming beam direction. The window tilting causes the deflection of the input beams, allowing them to scan across the sample. Descan is accomplished as the light collected from the sample goes backwards through the system, and experiences an opposite shift, bringing the beamlets back in line with the lenslet array. Therefore, the position of the foci array image at the 2D end of the fiber array is fixed, even though the beamlets are actually scanned across the sample.

Figure 2A:
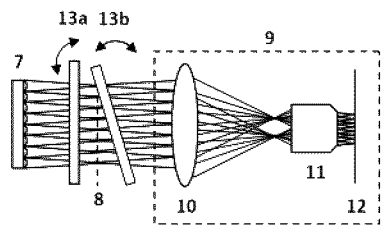
FIG. 2*a* depicts the apparatus of FIG. 1 used as part of a microscope.
Figure 2B:
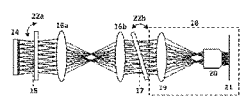
FIG. 2*b* shows more of the optical system using the portion shown in FIG. 2*a*.
Figure 2D:
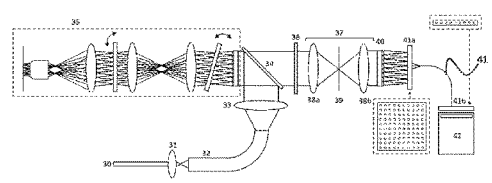
FIG. 2*d* shows a streak camera 2, using the embodiment of the window tilt scanning mechanism shown in FIG. 2*b*.
Figure 2C:
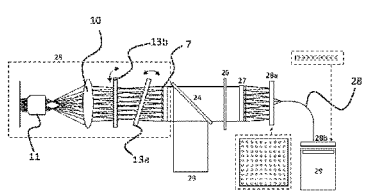
FIG. 2*c* shows an embodiment of the window tilt scanning mechanism from FIG. 2*a*.

FIGS. 2a to 2d show different embodiments of the present invention to highlight the technique and applications. FIG. 2a demonstrates how the window tilting method can be employed to scan a foci array generated by a lenslet array. FIG. 2b shows how the scanning is actually applied in our current experimental setup. FIG. 2c shows an example of how the scanning method from FIG. 2a can be applied to a streak camera based multiplexed scanning microscope. FIG. 2d shows a detailed implementation of a streak camera based system like FIG. 2c, including some extra elements.

More particularly, FIG. 2a shows an embodiment being used as part of the simplified architecture of a microscope. It depicts multiple beams of radiation passing through two refractive windows 13a and 13b. Each refractive window translates the beams perpendicularly to the propagation direction of the beam and to each other. This allows the beams of radiation to traverse a full 2D grid. A lenslet array 7 is used to generate a foci array at the image plane 8. The image plane 8 is shared with the tube lens 10 of the microscope 9, and so the image of the foci array is projected through the system by the tube lens 10 and the objective lens 11 to appear on the sample 12. Between the lenslet array 7 and tube lens 10, an x-tilting refractive window 13a and y-tilting refractive window 13b are placed in order to horizontally and vertically scan the foci array image, respectively. The foci array image generated at the sample will be shifted depending on the tilt of the refractive windows.

FIG. 2b shows the actual implementation of the section shown in FIG. 2a. The major difference is the use of an optical relay in order to generate the image plane at the proper position for the microscope. Once again, a lenslet array 14 is used to generate a foci array at the image plane 15. A pair of relay lenses 16a, 16b is used to relay the image plane, creating a new image plane 17, which can be shared with the tube lens 19 of the microscope 18. The foci array image at the image plane 17 is projected through the system by the tube lens 19 and objective lens 20 to generate the foci array on the sample 21. On either side of the relay lens pair 16a, 16b are the x-tilting refractive window 22a and y-tilting refractive window 22b, to cause the horizontal and vertical scanning of the foci array image, respectively. Without the use of the relay lens pair 16, there was not enough space to accommodate the two refractive windows 22a, 22b while still maintaining a common image plane with the tube lens 19.

The architecture shown in the FIG. 2a and FIG. 2b are simplified and depict the implementation of an embodiment at the entrance of a microscope. Non-inventive components are not shown; therefore it should not be interpreted as exclusive.

FIG. 2c shows the implementation of FIG. 2a as the scanning component of a simplified streak camera based multiplexed scanning system. The lenslet array 27 and 2D-1D fiber bundle 28 are used to convert the 2D foci array into a 1D foci array that can be fed into the 1D input of a device able to receive the signal. A wide beam of collimated excitation light 23 is reflected by the dichroic filter 24 into the scanning component 25, of which the subcomponents (lenslet array 7, two refractive windows 13a and 13b; and microscope 9 including objective lens 11 and tube lens and operation have been described in FIG. 2a. The emitted light is descanned as well by the scanning component 25 and transmitted through the dichroic filter 24, as well as the emission filter 26, onto a second lenslet array 27. The lenslet array 27 regenerates the foci array onto the 2D end 28a of the 2D-1D fiber array 28, where the foci array are rearranged into a 1D line at 28b, as the input for the streak camera 29.

FIG. 2d shows the actual experimental implementation. The major differences between FIG. 2c and FIG. 2d are the inclusion of detail associated with the beam shaper, the confocal unit, in addition to the actual scanning component as described in FIG. 2b. Excitation light from a diode laser 30 is coupled into a square core fiber array 32 with a coupling lens 31. The output of the square core fiber array 32 is square uniform light, which is expanded with a convex lens 33 and reflected by the dichroic filter 34 onto the scanning component 35, exactly as seen from FIG. 2b. The emitted light is descanned as well by the scanning component 35 and transmitted through the dichroic filter 34, as well as the emission filter 36. The confocal unit 37 includes two confocal lenses 38a, 38b and an adjustable pinhole 39 to reject the out-of-focus light. The collected light then enters a second lenslet array 40, which regenerates the foci array onto the 2D end 41a of the 2D-1D fiber array 41, where the foci array are rearranged into a 1D line at 41b, as the input for the streak camera 42.

Alternatively, the window galvo setup could be applied between the field lens and objective. However, it may require additional post-processing software and calibration. In the case of a finite tube length microscope, this can be accomplished by simply mounting the window galvos in the microscope between these two elements as microscopes usually have extra space to add custom elements. In infinity-corrected microscopes, windows will not result in any beam shift since it works with collimated light. Alternatively, prisms could be used, but this would be quite a different and much more complicated implementation (a lot of the linearity and uniformity advantages are eliminated).

The tilting refractive index material scanning mechanism described herein provides a very linear relation between tilt angle and deflection distance. When the tilt angle is between −25° and +25°, the deflection as a function of tilt angle can be expressed as linear. An embodiment of the tilting glass scanner would be to scan within this linear range, to cause a deflection ±Δd of the transmitted beams. Using the tilt angle 4 as defined in FIG. 1, a positive tilt angle would result in the refractive medium 1 tilting counter-clockwise, and causing the transmitted light beams to be uniformly deflected upwards by a distance 5. If the tilt angle were adjusted to be negative, the glass would be tilted clockwise, and the transmitted beams would be deflected downwards instead. When the tilt angle is 0, the glass is normal to the incident beams, and no deflection will be introduced. When the magnitude of the tilt angle exceeds 25° (or −25°), the deflection introduced on the transmitted light beams still treats all beams equally, but as it exits the region of small angle approximation, the relation between tilt angle 4 and deflection distance 5 is no longer linear. While it is not linear at larger angles, it is still very predictable, and so could be implemented. However, due to the added complication, and the worsening transmission of the glass at large angles, it is much preferred to increase the thickness of the glass to improve the deflection range at this point.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An apparatus for foci array scanning, comprising:
    at least one lenslet array for producing a plurality of light beams travelling in a given direction said lenslet array generating a foci array at an image plane located in a predetermined position;
    a microscope architecture including a tube lens and an objective lens, said tube lens being positioned for focusing the plurality of light beams onto said objective lens which is configured to focus the light beams onto an area to be imaged in an x-y plane which is perpendicular to the given direction the light beams are travelling in, said at least one lenslet array and said microscope architecture configured such that the image plane is shared with said field lens such that said foci array is projected through the tube lens onto the area to be imaged to form a conjugate plane;
    a scanning array located between said lenslet array and said microscope architecture which includes at least two refractive windows spaced from each other, each refractive window having parallel opposed surfaces and having a preselected index of refraction, wherein for a given index of refraction and a given angle of incidence of each light beam from the array of light beams on one of said opposed surfaces, each beam of light, upon exiting the other opposed surface, is translated a known amount laterally, and parallel to, each beam's direction of propagation independently of a location of contact between the array of light beams and refractive windows, said refractive windows being mounted for tilting to achieve raster scanning in the x-y plane, one of said refractive windows being mounted to translate the light beams laterally in the x-direction a first distance and the other refractive window being mounted to translate the light beams laterally in the y-direction a second distance such that tilting of the refractive windows causes deflection of the light beams in the x-y plane thereby scanning across the area to be imaged; and
    wherein light beams collected from the area to be imaged through said objective lens and said field lens goes backwards through the scanning array and experience an opposite shift in the x-direction by said first distance and in the y-direction by said second distance.

2. The apparatus of claim 1 wherein the at least two refractive windows are made of one of glass, plastic or fluorite.

3. The apparatus of claim 1 wherein the array of light beams includes a plurality of parallel, distinct beams of light.

4. The apparatus of claim 1 wherein the array of light beams of light comprises laser beams.

5. The apparatus of claim 1 wherein said refractive medium is movably mounted to allow adjustment of the angle of incidence of the array of light beams between about −25 to about +25 degrees.

6. The apparatus of claim 1 wherein the refractive medium operably refracts the array of light beams onto a 2D-1D fiber array which converts a 2D signal into a 1D signal.

7. The apparatus of claim 6 wherein the 1D signal is received by a streak camera.

8. The apparatus of claim 6 wherein the 1D signal is received by a spectrograph.

9. The apparatus of claim 1 wherein the at least two refractive windows are inserted in a microscope between the tube lens and the objective.

10. The apparatus of claim 1, wherein said at least one lenslet array is one lenslet array, and wherein the microscope architecture and the lenslet array are configured so that the light beams collected from the area imaged are directed back to the lenslet array during descanning.

11. The apparatus of claim 1, wherein said at least one lenslet array is a first lenslet array, said apparatus including a second lenslet array and a beam splitter, said beamsplitter and said second lenslet array and being positioned with respect to each other and said scanning array such that the light beams collected from the area imaged are incident on the beam splitter after passing through said scanning array and then directed to said second lenslet array during descanning.

* * * * *